(12) United States Patent
Aga et al.

(10) Patent No.: US 9,951,979 B2
(45) Date of Patent: Apr. 24, 2018

(54) ELECTRICAL ENERGY STORAGE AND DISCHARGE SYSTEM

(71) Applicant: ALSTOM Technology Ltd, Baden (CH)

(72) Inventors: Vipluv Aga, Zurich (CH); Enrico Conte, Schliern b. Koeniz (CH)

(73) Assignee: General Electric Technology GmbH, Baden (CH)

( * ) Notice: Subject to any disclaimer, the term of this patent is extended or adjusted under 35 U.S.C. 154(b) by 55 days.

(21) Appl. No.: 15/012,155

(22) Filed: Feb. 1, 2016

(65) Prior Publication Data

US 2016/0222830 A1 Aug. 4, 2016

(30) Foreign Application Priority Data

Feb. 4, 2015 (EP) .................................. 15153755

(51) Int. Cl.
| | |
|---|---|
| *F25B 30/00* | (2006.01) |
| *F01K 23/04* | (2006.01) |
| *F03G 6/06* | (2006.01) |
| *F28D 20/00* | (2006.01) |
| *F03G 6/00* | (2006.01) |
| *F01K 3/18* | (2006.01) |
| *F01K 3/12* | (2006.01) |

(52) U.S. Cl.
CPC .............. *F25B 30/00* (2013.01); *F01K 3/12* (2013.01); *F01K 3/18* (2013.01); *F01K 23/04* (2013.01); *F03G 6/00* (2013.01); *F03G 6/06* (2013.01); *F28D 20/00* (2013.01); *F28D 2020/0004* (2013.01); *Y02E 10/46* (2013.01)

(58) Field of Classification Search
CPC . F25B 30/00; F01K 23/04; F01K 3/12; F01K 3/18; F03G 6/00; F03G 6/06; F28D 20/00; F28D 2020/0004; Y02E 10/46
USPC ................................ 60/641.8, 659, 676, 698
See application file for complete search history.

(56) References Cited

U.S. PATENT DOCUMENTS

| | | | |
|---|---|---|---|
| 4,089,744 A | 5/1978 | Cahn | |
| 8,365,529 B2 | 2/2013 | Litwin et al. | |
| 2008/0034757 A1 | 2/2008 | Skowronski et al. | |
| 2010/0212656 A1* | 8/2010 | Qiu .......................... | F03G 6/06 126/618 |

(Continued)

FOREIGN PATENT DOCUMENTS

| | | |
|---|---|---|
| EP | 2 602 443 A1 | 6/2013 |
| WO | 2012/168251 A1 | 12/2012 |
| WO | 2013/064425 A1 | 5/2013 |

*Primary Examiner* — Hoang Nguyen
(74) *Attorney, Agent, or Firm* — Dority & Manning, P.A.

(57) ABSTRACT

Electrical energy storage and discharge system for storing electrical energy as thermal energy includes a heat pump cycle with first working fluid, a water steam cycle with second working fluid, a first thermal storage system with first thermal fluid, a second thermal storage system with second thermal fluid, an electrical heater member and a power regulating member, fluidly connected to each other. The system includes fluidly connected first cold and hot storage tanks, and the system includes fluidly connected second cold and hot storage tanks. The electrical heater is operably connected to the system between the tanks. The power regulating member is electrically connected to one or more electrical sources to regulate excess electrical energy, partially, to the electrical heater, and partially, to the heat pump cycle.

10 Claims, 4 Drawing Sheets

(56) References Cited

U.S. PATENT DOCUMENTS

| | | | |
|---|---|---|---|
| 2010/0218500 A1* | 9/2010 | Ruer | F01K 3/12 60/659 |
| 2010/0263947 A1 | 10/2010 | Reichart et al. | |
| 2010/0264732 A1 | 10/2010 | Beck | |
| 2011/0226440 A1* | 9/2011 | Bissell | F28D 20/0039 165/10 |
| 2013/0312413 A1* | 11/2013 | Herzog | F03G 6/065 60/641.15 |
| 2014/0075939 A1* | 3/2014 | Aga | F01K 3/12 60/641.11 |
| 2014/0167505 A1 | 6/2014 | Beck | |

* cited by examiner

ELECTRICAL ENERGY STORAGE AND DISCHARGE SYSTEM

CROSS-REFERENCE TO RELATED APPLICATIONS

This application claims priority to European Patent Convention No. 15153755.2 filed Feb. 4, 2015, the contents of which are hereby incorporated in its entirety.

TECHNICAL FIELD

The present disclosure relates generally to electrical energy storage and discharge systems with thermal storage and more particularly to electrical energy storage system with heat pump charging cycles that use thermal fluids to store energy.

BACKGROUND

Renewables (wind, solar) are intermittent sources of power generation and therefore these systems require cost-effective energy storage and recovery systems to match demand with generation. Often, in regions characterized by abundant production of renewable power and weak long distance transmission infrastructure, renewable generation sources have to be curtailed, when production exceeds demand. Integrating batteries with renewable energy sources to store excess generated electrical energy is quite expensive. Other methods may include utilizing an energy storage infrastructure based on hot and cold storage tanks with molten salt, to store such excess electricity directly, or indirectly, using a compressor and turbine arrangement running with an appropriate working fluid in a heat pump mode. This energy storage system may be integrated with the molten salt storage system of a Concentrated Solar Power (CSP) plant.

However, if such excess electricity were to be directly used to heat the molten salt from the cold tank to the hot storage tank, this may be inefficient use of electricity and would not be economical to use for integration with large scale photovoltaic or wind plants. Further, indirectly heating of the molten salt using excess electricity through a heat pump cycle may achieve higher efficiency but may be limited to a maximum temperature dictated by the heat pump technology, well below the maximum temperature achievable by the molten salt of about 570° C. Generally, in the heat pump mode, the most promising fluid that may be used would be carbon dioxide ($CO_2$), which can be compressed with commercially available compressor system to very high pressures, but at maximum temperature typically between 300° C. and 400° C.

In a heat pump cycle, higher temperature, until 600° C., though theoretically possible, is not generally practically implemented because this may necessitate the use of high performance metals and ultra-high precision manufacturing, which drastically increases the cost of such compressors resulting in an overly costly system. Further, using the standard components and achieving the targeted temperature of the molten salt may become imperative to balance the cost of addition with the loss of efficiency.

Accordingly, there is requirement of improved electrical energy storage and discharge system that uses thermal fluids to store energy and where such balance may be achieved.

SUMMARY

The present disclosure discloses an alternate energy storage and discharge system which can provide efficient and flexible thermal storage and discharge phase for electricity generation. The system will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe improved alternate energy storage and discharge system that may be capable of utilizing excess electrical energy and achieving targeted temperature of the molten salt using standard components. The disclosure is based on the general idea of obtaining targeted temperature of the molten salt by accumulating and distributing the excess electrical energy from one or more electrical sources to generate heat using heat pump cycle and heat using an electrical heater.

In one aspect of the present disclosure, an Electrical Energy Storage and Discharge system for storing electrical energy as thermal energy includes a heat pump cycle, a water steam cycle, a first thermal storage system, a second thermal storage system, an electrical heater member and a power regulating member. The heat pump cycle includes a first working fluid and the water steam cycle includes second working fluid. The first thermal storage system includes a first thermal fluid, and is fluidly connected to the heat pump cycle and the water steam cycle. The first thermal storage system, with the first thermal fluid, includes a first cold storage tank, and a first hot storage tank fluidly connected to the first cold storage tank. The second thermal storage system having a second thermal fluid, and is fluidly connected to the heat pump cycle and the water steam cycle. The second thermal fluid includes a second cold storage tank, and a second hot storage tank fluidly connected to the second cold storage tank. The electrical heater member is operably connected to the first thermal storage system between the first and second storage tanks. The power regulating member is electrically connected to one or more electrical sources to regulate excess electrical energy of the electrical sources to supply the excess electrical energy, partially, to the electrical heater member, and partially, to the heat pump cycle to enable storage of the excess electrical energy as thermal energy in the first thermal fluid up to predetermined level.

In accordance with embodiments, the heat pump cycle includes a compressor for compressing the first working fluid; a heat exchanger downstream of the compressor; and an evaporator/heater fluidly connected to the heat exchanger. The heat pump cycle is fluidly connected to the first thermal storage system via a first fluid line passing through the heat exchanger to supply heat of the first working fluid to the first thermal fluid coming from the first cold storage tank to reach a moderate temperature value and supply to the electrical heating source located downstream of the heat exchanger. Further, the heat pump cycle is fluidly connected to the second thermal storage system via a third fluid line passing through the evaporator/heater, to receive heat from the second thermal fluid coming from the second hot storage tank. In accordance with embodiments, the heat pump cycle is a transcritical or supercritical cycle, wherein the working fluid is in a supercritical state in part of or throughout the cycle.

In accordance with embodiments, the water steam cycle includes a steam turbine for expanding steam; a condenser downstream of the steam turbine; a first water heater downstream of the condenser; and a boiler downstream of the first water heater for converting water of the cycle into steam. The water steam cycle is fluidly connected to the first thermal storage system via a second fluid line passing through the boiler to supply heat of the first thermal fluid to the water steam cycle. Further, the water steam cycle is fluidly connected to the second thermal storage at least via a fourth fluid line passing through to the first water heater or via a fifth fluid line passing through the condenser, to heat the second thermal fluid coming from the second cold storage tank.

In accordance with embodiments, the steam turbine is a multi-stage steam turbine with an extraction line configured and arranged to extract steam from the steam turbine from an intermediate stage. The extraction line is connected to a second water heater located in the water steam cycle downstream of the first water heater so as enable further heating of water in the water steam cycle with extraction steam.

In accordance with embodiments, the power regulating member may include algorithm automated to utilise excess of the electrical energy from the electrical sources including at least one of solar power generating systems, wind power generating systems, grids, and the like.

In accordance with embodiments, the thermal storage system, includes a third storage tank disposed between the first and second hot storage tank at upstream of the electrical heater member and downstream of the heat exchanger to store moderately heated the first thermal fluid in the third storage tank.

In accordance with embodiments, the first thermal fluid is molten salt.

In accordance with embodiments, the second thermal fluid is one of water, pressured water, oil, synthetic oil and mineral oil.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above-described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and devices are shown in block diagrams form only, in order to avoid obscuring the disclosure. Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms used herein do not denote any order, elevation or importance, but rather are used to distinguish one element from another. Further, the terms "a," "an," and "plurality" herein do not denote a limitation of quantity, but rather denote the presence of at least one of the referenced item.

Figure 1:
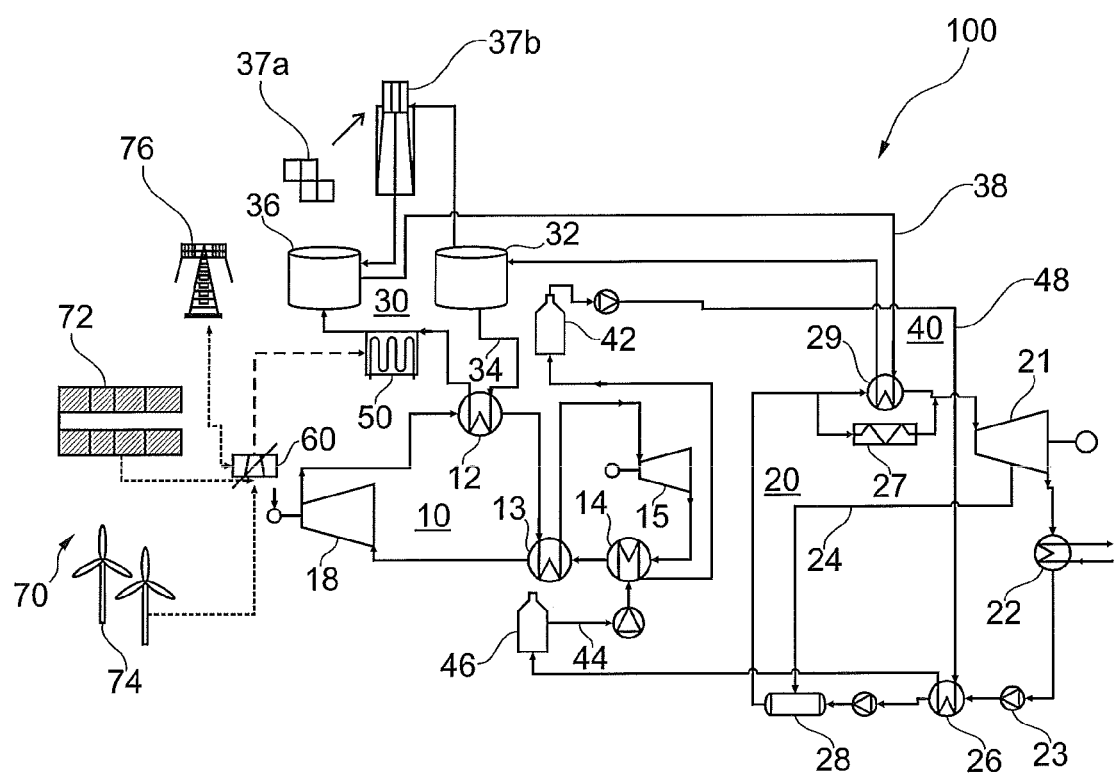
FIG. 1 is a schematic of an Electrical energy storage system, in accordance with embodiments of the present disclosure.

Referring to FIG. 1, a schematic of an Electrical energy storage system 100 (hereinafter referred to as 'system 100') is depicted in accordance with an exemplary embodiment of the present disclosure. Exemplary embodiment as shown in FIG. 1 depict the system 100 in its simplest form, which includes a heat pump cycle 10, a water steam cycle 20, a first thermal storage system 30, which is a warmer thermal storage system, and a second thermal storage system 40, which is a colder thermal storage system interconnecting the heat pump cycle 10 and the water steam cycle 20 respectively. The system 100 further includes an electrical heater member 50 operably connected to the first thermal storage system 30. Furthermore, the system 100 includes a power regulating member 60 to regulate excess electricity to be converted into the thermal energy and being stored to be utilised upon requirement.

In accordance with embodiment, the heat pump cycle 10 may include any known heat pump cycle 10 having cycles configured as subcritical, transcritical and supercritical cycles. In an exemplary embodiment shown in FIG. 1, the heat pump cycle 10 includes a compressor 18 for compressing a first working fluid, a heat exchanger 12 downstream of the compressor 18, an expander 15 downstream of the heat exchanger 12, and an evaporator/heater 14 fluidly connected to the heat exchanger 12 and located between the expander 15 and the compressor 18 on the low pressure side of the heat pump cycle 10.

In accordance with embodiment as shown in FIG. 1, a recuperator 13 may be fluidly located on the high pressure side of the heat pump cycle 10 between the heat exchanger 12 and the expender 15, and on the low pressure side of the heat pump cycle 10 between the compressor 18 and evaporator/heater 16. In this location the recuperator 13 transfers thermal energy from high pressure working fluid to the lower pressure working fluid.

In accordance with embodiment as shown in FIG. 1, the water steam cycle 20 sequentially comprises a steam turbine 21, a condenser 22 for condensing steam exhausted of the steam turbine 21, a condensate pump 23 for pressuring condensed water, a first water heater 26 for transferring heat to the low temperature storage and a first boiler 29 for generating steam in the cycle to be returned to the steam turbine 21.

In accordance with embodiment as shown in FIG. 1, the steam turbine 21 may be a multistage steam turbine 21 and the water steam circuit includes a second water heater 28 for heating condensate with steam extracted via an extraction steam line 24. A further second boiler 27 is located downstream of the second water heater 28 preferably fluidly parallel to the first boiler 29. Both the second water heater 28 and the second boiler 27 may be used to provide supplementary energy input in the water steam cycle 20 or else operate the water steam cycle 20 in the absence of heat input from the warmer thermal storage system 30.

In accordance with embodiment as shown in FIG. 1, the first thermal storage system 30 with a first thermal fluid, being a warmer thermal storage system. The first thermal storage system 30 (also referred to as 'warmer thermal storage system 30') includes a first warmer cold storage tank 32 and a first warmer hot storage tank 36 that are fluidly connected by means of a first fluid line 34 passing through the heat exchanger 12 of the heat pump cycle 10. The heat exchanger 12 may heat the first thermal fluid up to a moderate temperature, for example, about 300° C. to 400° C. A second fluid line 38 connects the first warmer hot storage tank 36 to the first warmer cold storage tank 32 via the first steam boiler 29. In this way, thermal energy from the first warmer hot storage tank 36 can be used as an energy source in the water steam cycle 20. Although, in an exemplary embodiment the first warmer hot storage tank 36 may be configured to only hold thermal fluid, in another exemplary embodiment, the first warmer hot storage tank 36 additionally includes heat retention means such as heat absorbent metal, rocks or other minerals that enable the long term retention of heat. In another exemplary embodiment, the warmer thermal storage system 30 may include a single storage tank, filled with material that hinders the mixing of the cold and warm fluid. In day times, the first thermal fluid may be heated via heliostat 37a and receiver 37b arrangement and stored using tanks arrangement 32, 36, as known in the art.

Figure 2:
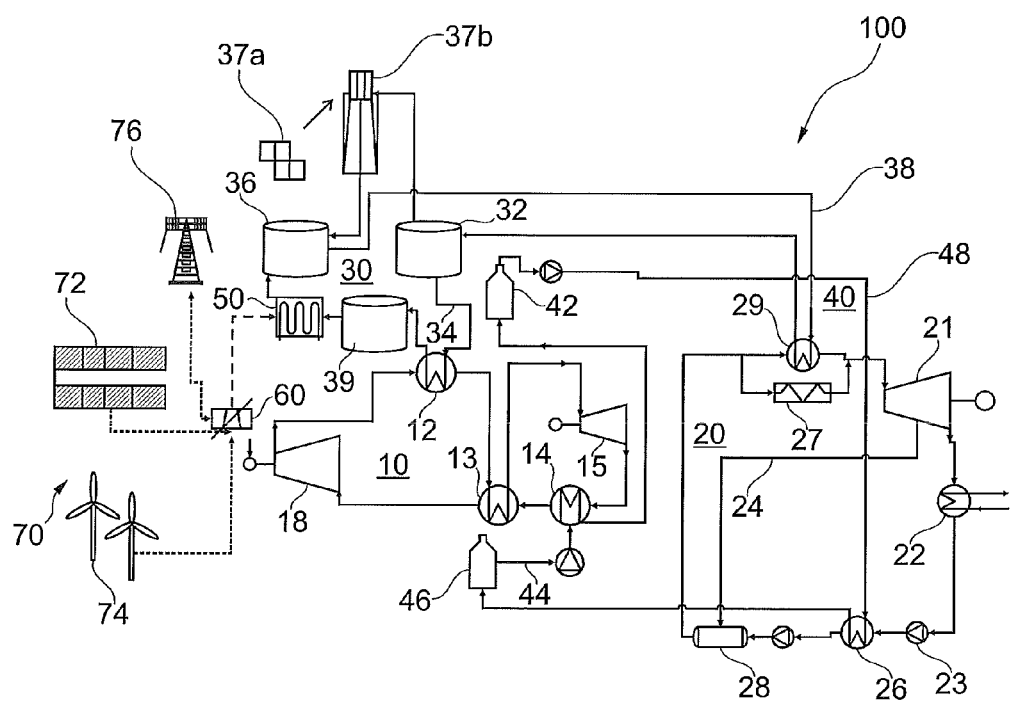
FIG. 2 is a schematic of an Electrical energy storage system, in accordance with additional embodiment of the present disclosure.

In accordance with embodiment as shown in FIG. 1, the electrical heater member 50 may operably be connected to the first thermal storage system 30 between the first warmer hot and cold storage tanks 32, 36 in the first fluid line 34, downstream of the heat exchanger 12 of the heat pump cycle 10. The electrical heater member 50 may receive the first thermal fluid heated up to a moderate temperature and further heat thereto up to a predetermined temperature, for example about 500° C. to 600° C. However, in accordance with other embodiments, as shown in FIG. 2, the thermal storage system 30 may also include a third storage tank 39 disposed between the first hot and cold storage tanks 32, 36, at upstream of the electrical heater member 50 and downstream of the heat exchanger 12 to store the first moderately heated thermal fluid in the third storage tank 39. The third storage tank 39 may be installed to act as buffer and decouple the heat pump cycle 10 operations from the electrical heating operation if the two charging cycles need to be operated independently with first thermal storage system 30, thereby allowing to take advantage of varying price of the electricity to be purchased.

In accordance with embodiment as shown in FIG. 1, the second thermal storage system 40 with a second thermal fluid being colder thermal storage system. The second thermal storage system 40 includes a second colder hot storage tank 46 and a second colder cold storage tank 42 fluidly connected by means of a third fluid line 44 passing through the evaporator/heater 14 of the heat pump cycle 10. A fourth fluid line 48 further connects the colder cold storage tank 42 to the colder hot storage tank 46 via at least the first water heater 26, as shown in FIG. 1, or the condenser 22, as shown in FIG. 3C of the water steam cycle 20. In this way, thermal energy from steam cycle 20 may be used to heat up water from the colder cold storage tank 42 and replenish the colder warm storage tank 46. Although, in an exemplary embodiment the colder hot storage tank 46 may be configured to only hold thermal fluid, in another exemplary embodiment, the colder hot storage tank 46 additionally includes heat retention means such as heat absorbent metal, rocks or other minerals that enable the long term retention of heat. In another exemplary embodiment, the colder thermal storage system may consist of a single storage tank, filled with material that hinders the mixing of the colder cold and warm fluid.

In this arrangement, the power regulating member 60 may be an algorithm based power regulating member 60 electrically connected to one or more electrical sources 70, including at least one of solar power generating systems 72, wind power generating systems 74, grids 76, and the like, to regulate excess electrical energy of the electrical sources 70 to supply the excess electrical energy, partially, to the electrical heater member 50, and partially, to the heat pump cycle 10 to enable storage of the excess electrical energy as thermal energy. In said arrangement, the heat pump cycle 10 and the electrical heater member 50 act as a charging system for converting electrical energy into the thermal energy.

Partial electrical energy from the power regulating member 60 is used to drive the compressor 18 of the heat pump cycle 10 into thermal energy that is supplied stored the warmer thermal storage system 30. Further, other partial electrical energy is supplied to the electrical heater member 50 via the power regulating member 60 to be converted into thermal energy to be further stored in the warmer thermal storage system 30 to attain the maximum required temperature of the first thermal fluid, for example about 500° C. to 600° C. Further, the water steam cycle 20 is a discharge system for converting thermal energy storage in the warmer thermal storage system 30 to electricity by using the steam turbine 21 to drive a generator. Further the water steam cycle 20 may be used to replenish the low temperature energy in the colder storage system, which may be used by the heat pump cycle 10.

Figure 3A:
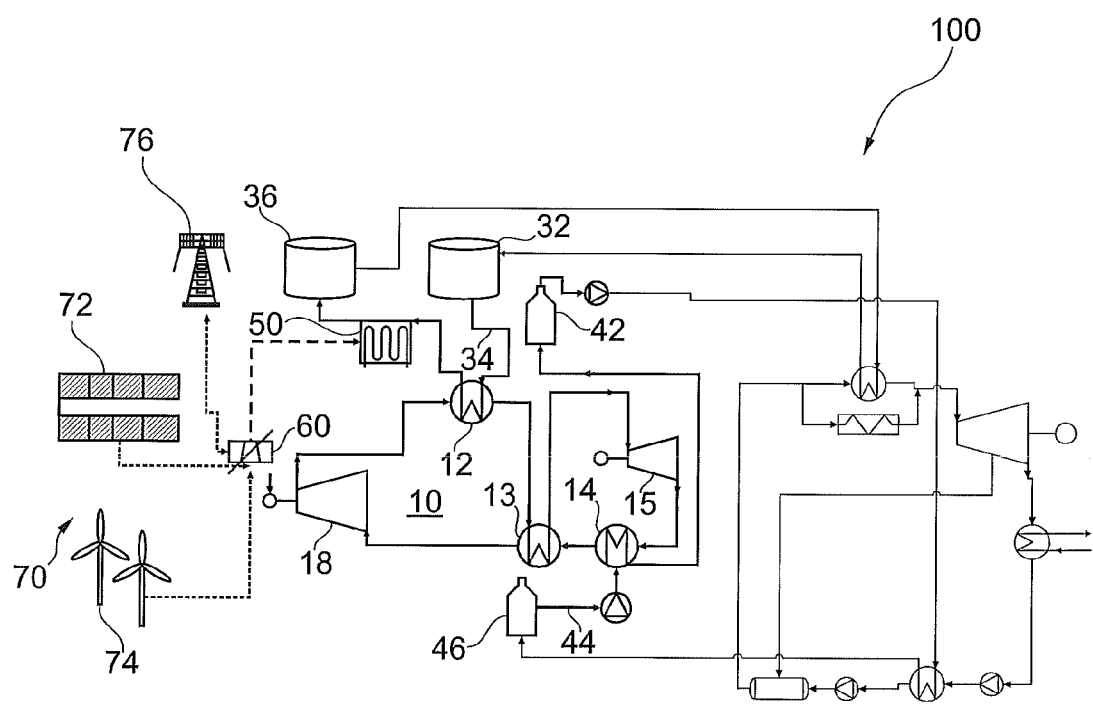
FIGS. 3A to 3C are schematics of Electrical energy storage systems depicting charging and discharging of the cycle, in accordance with various embodiment of the present disclosure.
Figure 3B:
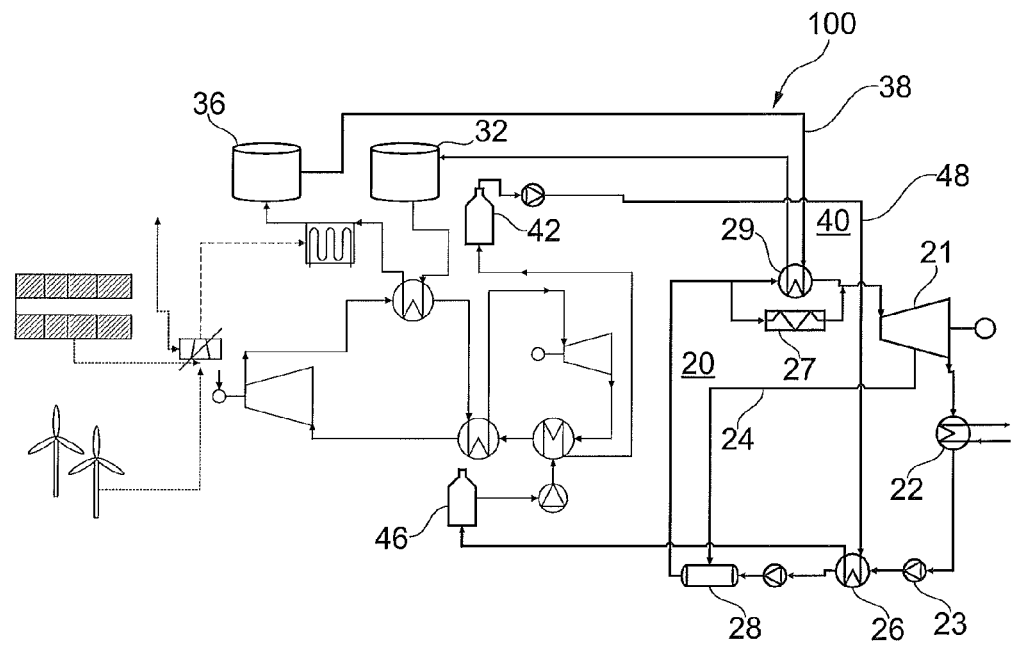
Figure 3C:
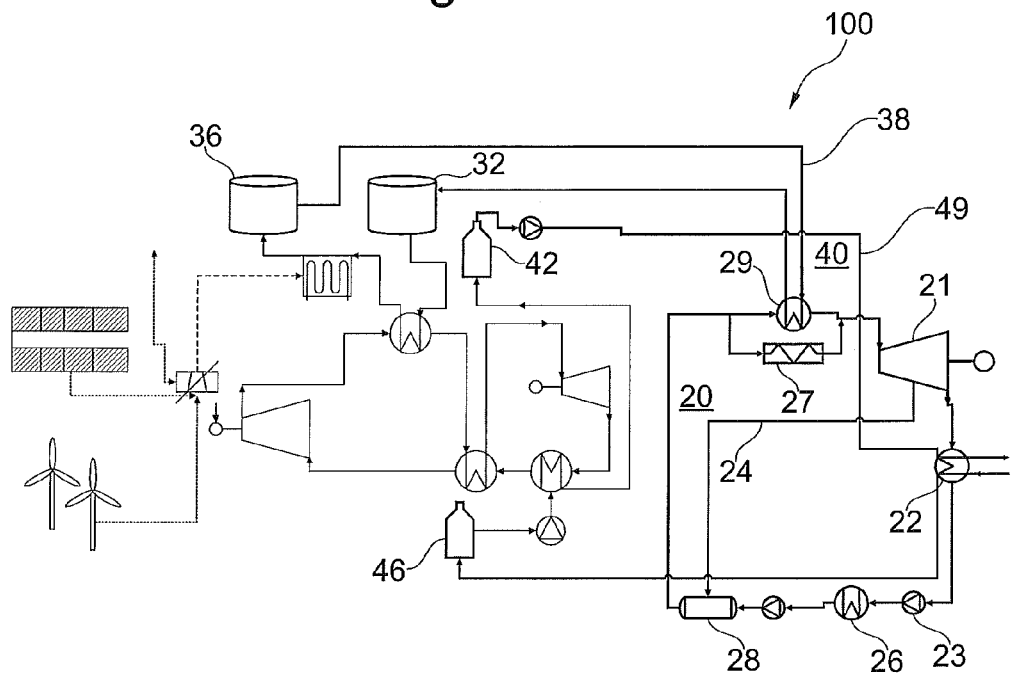

Referring now to FIGS. 3A to 3B, the systems 100 are illustrated depicting charging and discharging of the system 100. In accordance with embodiment, FIG. 3A, illustrates charging of the system 100, and FIGS. 3B and 3C, illustrate discharging of the system 100. The charging cycle may occur for example during day times, and the discharging cycle may occur for example during night times. Further, the charging cycle means heating the first thermal fluid up to a predetermined temperature and storing thereto in the first thermal storage system (30). Similarly, the discharging cycle means utilizing the heat of the first thermal fluid for operating the system 100.

An exemplary method, as depicted in FIG. 3A (dark lines and components), of a charging cycle using a transcritical working fluid involves the following steps. Firstly, excess electricity form the various electrical sources 70 is regulated via the power regulating member 60, partially, to drive the heat pump cycle 10 and partially to the electrical heater member 50. In the heat pump cycle 10 electricity drives the motor to enable compressor 18 to compress the first working fluid of the heat pump cycle 10 to a supercritical state in order to reach the highest temperature allowed by the first storage medium which is recovered by the heat exchanger 12 located downstream of the compressor 18.

In a following recuperating step, cooled high pressure first working fluid is used to preheat low pressure working fluid in a recuperator 13 so as to limit the outlet pressure of compressor 18. Further, cooled first working fluid is expanded in an expander 15 that throttles the pressure of the first working fluid to a lower pressure. The working fluid is then preheated/evaporated and heated in evaporator/heater 14 before being returned to the compressor. This heating and evaporation step may be achieved by using heat from the environment or else heat from the colder second thermal storage cycle 40 which increase efficiency of the heat pump cycle 10. The heat pump cycle 10, in charging mode, as shown in FIG. 3A, transfers heat stored as the temperature difference between the two second cold and hot storage tanks 42, 46, of the second thermal storage system 40, the colder one (tank 42) ranging between about 30° C. to about 60° C. and the hotter one (tank 46) between about 80° C. to about 120° C., to a higher temperature as exemplified by the temperature difference between about 265° C. to about 565° C. in the two first cold and hot storage tanks 32, 36 of the first thermal storage system 30.

At the end of this charging cycle, for example considering during day time, the second hot water tank 46 will be empty and the second cold water tank 42 will be full.

However, as it is difficult and expensive to manufacture compressors and heat pumps which can operate at pressure 100-300 bars and at temperature above 300° C.-400° C., the heat pump cycle 10 is made to operate only until the limiting temperature that may be achieved using standard components of the heat pump cycle 10, i.e. up to a range of about 300° C.-400° C.

Above this temperature, the first thermal fluid in the the first thermal storage system (30) may be heated using the electrical heater member 50. Partial electrical energy is regulated via the power regulating member 60 to the electrical heater member 50 to be converted into thermal energy to be further stored in the warmer thermal storage system 30 to attain the maximum required temperature of the first thermal fluid, for example about 500° C. to 600° C.

An exemplary operating method, as per FIG. 3B (dark lines and components), for a discharge cycle involves the following steps. The water steam cycle 20 utilises the heat of the first thermal storage system 30 for producing steam and producing electricity as explained above. Further, the second thermal storage system 30 may be pre-heated during the discharging cycle whose heat may be utilised during the charging cycle by the heat pump cycle 10 as explained above. For doing so, in one embodiment, the second cold thermal fluid from the second cold storage tank 42 may be heated using the first water heater 26 of the water steam cycle 20 before it is returned to the second hot storage tank 42 via fourth fluid line 48, as shown in FIG. 3B, to attained the temperature of the second cold thermal fluid from about 30° C. to about 80° C. However, in another exemplary embodiment, as shown in FIG. 3C (dark lines and components), the second cold thermal fluid may take this heat from the condenser 22 of the water steam cycle 20, when the second cold storage tank 42 may be heated using the condenser 22 instead of the first water heater 26 before it is returned to the second hot storage tank 42 via a fifth fluid line 49 to the attained temperature of the second cold thermal fluid from about 30° C. to about 50° C. The use of the embodiment of the FIG. 3C may be made of the fact that an air cooled condenser, for example the condenser 22, typically used in CSP has a higher temperature of operation than water cooled, then it becomes more efficient for the charging cycle to exchange the low temperature heat with the air cooled condenser rather than the preheating train.

While thermal fluids and the working fluid of the heat pump cycle 10 may be adapted to meet the requirements of the system 100, in an exemplary embodiment the warmer first thermal fluid may be molten salt (60% $NaNO_3$ 40% $KNO_3$) operated at a temperature range of between 270° C. to 565° C. and having a freezing point 238° C. while the colder second thermal fluid may be water, pressurized or not, or also may be oil, synthetic oil and mineral oil. At the same time the working fluid is $CO_2$ selected for transcritical charging cycle due to appropriate physical properties which include non-flammability, non-degradation at the highest temperature and potential to be compressible up to 1000 bar. Alternatively, the working fluid may be air.

The system 100 of the present disclosure is advantageous in various scopes such as described above. The system is an improved alternate energy storage and discharge system that may be capable of utilizing excess electrical energy and achieving targeted temperature of the molten salt using standard components in an economical manner, which would otherwise be either very costly or theoretically not possible.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An electrical energy storage and discharge system for storing electrical energy as thermal energy, comprising:
   a heat pump cycle having a first working fluid;
   a water steam cycle having a second working fluid;
   a first thermal storage system having a first thermal fluid, and fluidly connected to the heat pump cycle and the water steam cycle, the first thermal storage system, with the first thermal fluid, comprising,
   a first cold storage tank, and
   a first hot storage tank fluidly connected to the first cold storage tank;

a second thermal storage system having a second thermal fluid, and fluidly connected to the heat pump cycle and the water steam cycle, the second thermal fluid, comprising,
   a second cold storage tank, and
   a second hot storage tank fluidly connected to the second cold storage tank;
an electrical heater member operably connected to the first thermal storage system between the first and second storage tanks; and
a power regulating member electrically connected to one or more electrical sources to regulate excess electrical energy of the electrical sources to supply the excess electrical energy, partially, to the electrical heater member , and partially, to the heat pump cycle to enable storage of the excess electrical energy as thermal energy in the first thermal fluid.

2. The electrical energy storage and discharge system of claim 1, wherein the heat pump cycle comprises:
   a compressor for compressing the first working fluid;
   a heat exchanger downstream of the compressor; and
   an evaporator/heater fluidly connected to the heat exchanger,
   wherein the heat pump cycle is fluidly connected to the first thermal storage system via a first fluid line passing through the heat exchanger to supply heat of the first working fluid to the first thermal fluid coming from the first cold storage tank to reach a moderate temperature value and supply to the electrical heating source located downstream of the heat exchanger, and
   wherein the heat pump cycle is fluidly connected to the second thermal storage system via a third fluid line passing through the evaporator/heater, to receive heat from the second thermal fluid coming from the second hot storage tank.

3. The electrical energy storage and discharge system of claim 1, wherein the water steam cycle comprises:
   a steam turbine for expanding steam;
   a condenser downstream of the steam turbine;
   a first water heater downstream of the condenser; and
   a boiler downstream of the first water heater for converting water of the cycle into steam,
   wherein the water steam cycle is fluidly connected to the first thermal storage system via a second fluid line passing through the boiler to supply heat of the first thermal fluid to the water steam cycle, and,
   wherein the water steam cycle is fluidly connected to the second thermal storage at least via a fourth fluid line passing through to the first water heater or via a fifth fluid line passing through the condenser, to heat the second thermal fluid coming from the second cold storage tank.

4. The electrical energy storage and discharge system of claim 3, wherein the steam turbine is a multi-stage steam turbine with an extraction line configured and arranged to extract steam from the steam turbine from an intermediate stage wherein the extraction line is connected to a second water heater located in the water steam cycle downstream of the first water heater so as enable further heating of water in the water steam cycle with extraction steam.

5. The electrical energy storage and discharge system of claim 1, wherein the power regulating member is an algorithm based power regulating member automated to utilise excess of the electrical energy for the electrical sources including at least one of solar power generating systems, wind power generating systems, grids, and the like.

6. The electrical energy storage and discharge system of claim 1, wherein the thermal storage system, comprises a third storage tank disposed between the first and second hot storage tank, at upstream of the electrical heater member and downstream of the heat exchanger to store moderately heated the first thermal fluid in the third storage tank.

7. The electrical energy storage and discharge system of claim 1, wherein the heat pump cycle is a transcritical heat pump cycle.

8. The electrical energy storage and discharge system of claim 1, wherein the heat pump cycle is a supercritical heat pump cycle wherein the working fluid is in a supercritical state throughout the cycle.

9. The electrical energy storage and discharge system of claim 1, wherein the first thermal fluid is molten salt.

10. The electrical energy storage and discharge system of claim 1, wherein the second thermal fluid is one of water, pressured water, oil, synthetic oil and mineral oil.

* * * * *